Oct. 19, 1943. H. MORTON 2,332,162
MECHANICAL MOVEMENT
Filed Oct. 29, 1942
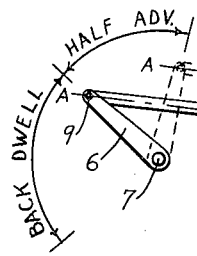
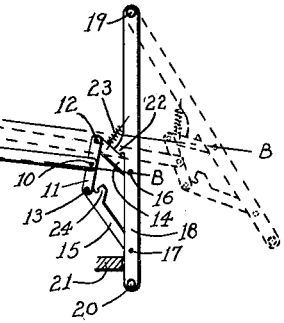
Fig. 1
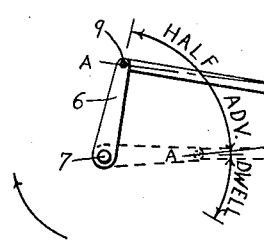
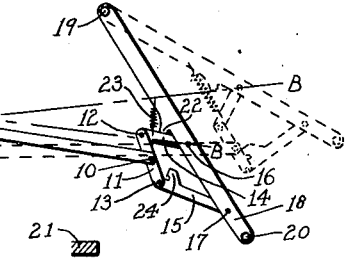
Fig. 2
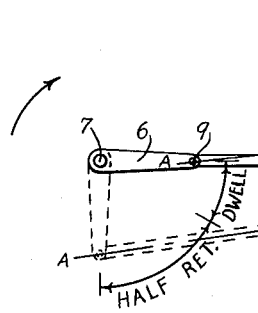
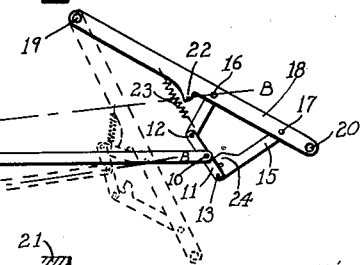
Fig. 3
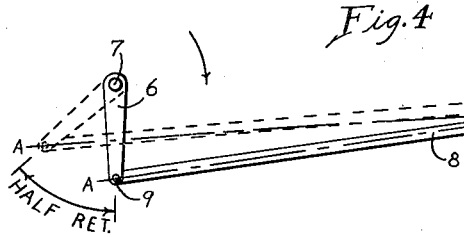
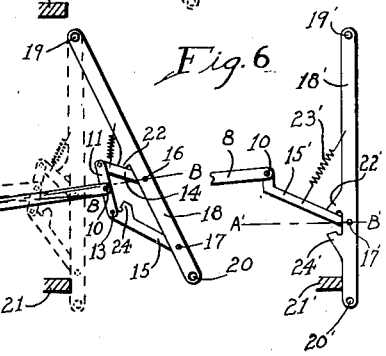
Fig. 4  Fig. 6
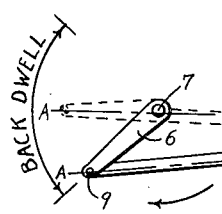
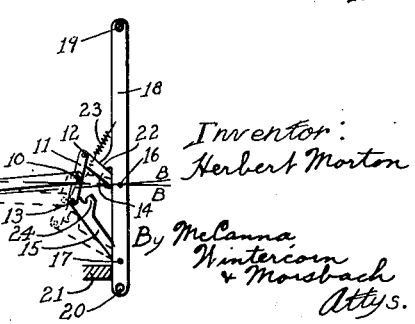
Fig. 5
Inventor:
Herbert Morton
By McCanna
Wintercorn
& Morsbach
Attys.

Patented Oct. 19, 1943

2,332,162

UNITED STATES PATENT OFFICE 2,332,162

MECHANICAL MOVEMENT

Herbert Morton, Joliet, Ill.

Application October 29, 1942, Serial No. 463,767

14 Claims. (Cl. 74—75)

This invention relates to a new and improved mechanical movement, and has for its principal object the provision of a mechanical movement providing a delayed stroke and fast return.

The mechanical movement of my invention is suitable for various uses, as, for example:

(1) For the beater action and shuttle bar action on a loom;
(2) For a bulldozer feed;
(3) For a bar folder in printing;
(4) For a take-off on printing presses;
(5) For transferring from one level to another in a bread-wrapping machine, or any machine where transfers from one level to another have to be made;
(6) For feed mechanisms in various automatic and semi-automatic machines,
(7) For punch presses, where stock has to be taken out and moved from a horizontal to a vertical plane, and
(8) For the main drive or feed drive on punch presses, printing presses, and other machines.

The eight preceding examples are, however, not to be construed as limiting the field of usefulness of my invention, inasmuch as it is applicable generally in the field of mechanics and machine design.

The two particular applications where the mechanical movement of my invention affords the greatest advantages are on the printing press and loom. In the Gordon printing press application, my improved mechanical movement makes possible the printing of a greater number of prints per minute, and permits the handling of larger sheets with greater safety. In the loom application, my improved mechanical movement when applied to the driving mechanism for the reed gives the desired dwell while the heddles change and while the bobbin crosses the frame, and when the weaving takes place eliminates pulling and sliding of the woof and warp.

The invention is illustrated in the accompanying drawing, in which—

Figs. 1 to 5 illustrate my improved mechanical movement in different positions of a complete cycle of movement, and Fig. 6 illustrates a modified or alternative construction.

Similar reference numerals are applied to corresponding parts throughout the views.

The reference numeral 6 designates a crank turning with a drive shaft 7 at a uniform speed. The link 8 is pivotally connected at one end, as at 9, with the crank 6, and is pivotally connected at the other end, as at 10, with a crosshead 11. The latter is pivotally connected at its opposite ends, as at 12 and 13, with one end of links 14 and 15, respectively. The other ends of the links 14 and 15 are pivotally connected, as at 16 and 17, with an arm 18 supported for oscillatory movement on a pivot 19 in fixed spaced relation to the drive shaft 7. The arm 18 is adapted to be pivotally connected by its free end 20 with the device to be operated with delayed stroke and fast return. The pivot point 20 can, of course, be located intermediate the ends of the arm 18 to vary the length of stroke of the operated device as desired. 21 is a limit stop in fixed or adjustably fixed spaced relation to the shaft 7 and pivot 19, and serves to limit the clockwise movement of the arm 18, as indicated in Figs. 1, 4, and 5. 22 is a limit stop on the arm 18 engageable by the link 14 to limit the clockwise swinging movement of the link 14 with respect to the arm 18, the link being normally urged into engagement with the stop by a coiled tension spring 23, as indicated in full lines in Figs. 1, 2, 4, and 5. Another limit stop 24 is provided on the link 15 for engagement with the crosshead 11 to limit clockwise movement of the crosshead relative to the link 15, as indicated in dotted lines in Fig. 2.

It should be obvious that the invention is not limited to the specific construction and proportion of parts shown. Each particular application of the present mechanical movement will require a certain length of arms, ratio of linkage, diameter of crank throw, and so forth, as determined by the plotting of velocity diagrams. Furthermore, the invention is not limited to operation in any particular plane of action.

In operation, the linkage 8—11—14—15, due to thrust or pull acting on one side or the other of the center line A—B, imparts to the arm 18 the desired cycle of delayed stroke and fast return, and, of course, the arm 18 transmits such motion to whatever is attached thereto at the point 20. Movement of the links 14 and 15 from the position where the link 14 engages the stop 22, as indicated in full lines in Fig. 1, to the position where the stop 24 engages the cross-head 11, as indicated in full lines in Fig. 3, provides an automatic adjustment in the length of the link connection between the crank 6 and arm 18, there being longer throw when the stop 24 engages the crosshead 11 and shorter throw when the stop 22 engages the link 14. The crank, it will be assumed, turns in a clockwise direction, as indicated by the arrows. Starting with the full line showing in Fig. 5, where the arm 18 is shown engaging the stop 21 at the end of the return movement, the crank 6 is free to move through the "back dwell" portion of its cycle, due to the fact that the link connection is automatically adjustable, as indicated by the dotted line showing of the links 8, 14, and 15 in Fig. 5, the only resistance to movement of the crank in the "back dwell" being that afforded by the spring 23. At the end of the "back dwell," the parts are in the position shown in full lines in Fig. 1, the spring 23 having returned the link 14 to engagement with the stop 22. The arm 18 is now advanced in the further clockwise movement of the crank from its full line to its dotted line position in Fig. 1. Attention is called to the fact that when the arm 18 reaches the dotted line position shown in Fig. 1, the pivot 12 is much closer to the line of thrust A—B than in the full line position of Fig. 1. The full line position of Fig. 2 corresponds approximately to the dotted line position of Fig. 1, and at a point intermediate the full and dotted line positions of the crank 6 in Fig. 2, the pivot 12 moves into the line A—B and past it, and when that occurs the arm 18 is given a snap advance as the links 14 and 15 snap over dead-center to the other extreme, where the stop 24 engages the crosshead 11, as indicated in dotted lines in Fig. 2. Right after the links have been extended for the snap advance of the arm 18, the link 8, due to the movement of the crank 6 past the dead-center position, shown in dotted lines in Fig. 2, reverses its operation, changing from a push on the arm 18 to a pull, and it should be apparent from a study of the full line position in Fig. 3 that as soon as the pivot 12 is below the line A—B, it will tend to move toward that line as pull is transmitted by the link 8 on the arm 18. The links 14 and 15 will therefore return to their former position, with the link 14 engaging the stop 22. In this movement of the links, there is no corresponding movement of the arm 18, and that accounts for the forward "dwell" indicated adjacent the crank 6 in Figs. 2 and 3. The subsequent movement of the crank 6 from the dotted line position of Fig. 3 to the full line position of Fig. 5 causes the return movement of the arm 18, the arm finally being positively limited by engagement with the stop 21 for the commencement of the next cycle, starting with the "back dwell" first mentioned. The spring 23 keeps the links 14 and 15 in the short throw position throughout the return movement.

Referring to Fig. 6, the arm 18' is pivoted at 19' and is arranged to be operatively connected with the device to be operated at the pivot point 20'. The arm is shown in engagement with the limit stop 21', which is in fixed or adjustably fixed spaced relation to the pivot 19', and the shaft 7 and crank 6 (not shown) for operating the link 8'. In this modified construction a single link 15' is provided pivotally connected to the arm 18' at 17' and movable through a limited angularity determined by limit stops 22' and 24' provided on the arm 18' on opposite sides of the pivot point 17'. In this form the link 8' is directly pivotally connected to the link 15' at 10', and the coiled tension spring 23' holds the link 15' normally in engagement with the stop 22'.

The operation of this mechanical movement is substantially the same as that shown in Figs. 1 to 5, the linkage, due to thrust or pull acting on one side or the other of the center line A'—B' imparts to the arm 18' the desired cycle of delayed stroke and fast return, and the arm 18' will, of course, transmit such motion to whatever is attached thereto at the point 20'. The center line A'—B' in this case extends through the pivots 17' and 9 (not shown), the pivot point 9 being the point of connection between the link 8' and the operating crank.

It is believed the foregoing description conveys a good understanding of the objects and advantages of my invention. The appended claims have been drawn to cover all legitimate modifications and adaptations.

I claim:

1. A mechanical movement, comprising, in combination, a crank adapted to rotate at substantially uniform velocity, a link pivotally connected with the crank, an arm pivotally mounted in fixed spaced relation to the axis of rotation of the crank and adapted to be oscillated by the link and to communicate movement therefrom to a part or mechanism to be operated, and means providing an automatically variable length connection between the link and arm, comprising a crosshead pivotally connected intermediate its ends to the end of said link, and two other links pivotally connected at one end to the opposite ends of the crosshead and pivotally connected at the other end to the arm at points thereon in longitudinally spaced relation, and spring means normally urging said last mentioned links to swing in one direction relative to said arm.

2. A mechanical movement as set forth in claim 1, including a limit stop for engagement with the arm at one end of its oscillatory movement, said stop being so located in relation to the axis of rotation of said crank that the crank is free to turn past a dead-center position, while the arm stops in engagement with said stop only upon extension relative to the arm of the pair of links attached to the crosshead against resistance of the spring means.

3. A mechanical movement as set forth in claim 1, including positive stop means for limiting oscillatory movement of the pair of links relative to the arm in either direction.

4. A mechanical movement as set forth in claim 1, including positive stop means for limiting oscillatory movement of the pair of links relative to the arm in either direction, and a limit stop for engagement with the arm at one end of its oscillatory movement, said stop being so located in relation to the axis of rotation of said crank that the crank is free to turn past a dead-center position, while the arm stops in engagement with said stop only upon extension relative to the arm of the aforesaid pair of links against resistance of the spring means.

5. A mechanical movement, comprising, in combination, a crank adapted to rotate at substantially uniform velocity, a link pivotally connected with the crank, an arm pivotally mounted in fixed spaced relation to the axis of rotation of the crank and adapted to be oscillated by the link and to communicate movement therefrom to a part or mechanism to be operated, and means providing an automatically variable length connection between the link and arm, including spring means normally tending to keep said connection at relatively short length, said spring means being yieldable to permit an increase in length of said connection.

6. A mechanical movement comprising, in combination, a crank adapted to rotate at substantially uniform velocity, a link pivotally connected with the crank, an arm pivotally mounted in fixed spaced relation to the axis of rotation of the crank and adapted to be oscillated by the link and to communicate movement therefrom to a part or mechanism to be operated, means providing an automatically variable length connection between the link and arm, and a limit stop for engagement with the arm at one end of its oscillatory movement, said stop being so located in relation to the axis of rotation of said crank that the crank is free to turn past a dead-center position, while the arm stops in engagement with said stop only upon extension relative to the arm of the means providing the adjustable length connection between the link and arm.

7. A mechanical movement, comprising, in combination, a crank adapted to rotate at substantially uniform velocity, a link pivotally connected with the crank, an arm pivotally mounted in fixed spaced relation to the axis of rotation of the crank and adapted to be oscillated by the link and to communicate movement therefrom to a part or mechanism to be operated, and means providing an adjustable length connection between the link and arm including a link pivotally connected at one end to the first link and at the other end to the arm and movable from one side to the other of a dead-center position with respect to a line drawn from the pivotal connection on the arm through the pivotal connection of the first mentioned link with the crank, means for positively limiting oscillatory movement of said connecting link with respect to said arm in either direction, and spring means tending normally to move said connecting link in one direction relative to the arm to an extreme position.

8. A mechanical movement as set forth in claim 7, including a limit stop for engagement with the arm at one end of its oscillatory movement, said stop being so located in relation to the axis of rotation of said crank that the crank is free to turn past a dead-center position, while the arm stops in engagement with said stop only upon extension relative to the arm of the means providing the adjustable length connection between the link and arm.

9. A mechanical movement, comprising, in combination, a rotatable crank movable through 360°, a relatively long link pivotally connected with the crank for push and pull oscillation of an arm, an arm disposed in transverse relation to the link and pivotally mounted at its one end in fixed spaced relation to the axis of rotation of the crank operable at the free end portion thereof by the link and adapted when oscillated to communicate movement to a part or mechanism to be operated, relatively short link means pivotally connected at one end to the first link and at the other end to the free end portion of the arm and movable from one side to the other of an intermediate dead center position providing an adjustable length connection between the first link and arm, means for positively limiting oscillatory movement of said connecting link means with respect to one of said arm and first link, and spring means tending normally to move said connecting link means in one direction to one extreme position with respect to the first link and arm.

10. A mechanical movement as set forth in claim 9, including stop means to limit movement of the arm at one end of its oscillatory movement, said stop means being so located in relation to the axis of rotation of said crank that the crank is free to turn past a dead center position while the arm is stopped, the link means providing the adjustable length connection between the link and arm being extensible while the arm is stopped.

11. A mechanical movement, comprising, in combination, a rotatable crank adapted to turn through 360°, a relatively long link pivotally connected with the crank, an arm disposed in transverse relation to the free end of the link and pivotally mounted at one end in fixed spaced relation to the axis of rotation of the crank and adapted to be oscillated by the link and to communicate movement to a part or mechanism to be operated, a relatively short link pivotally connected at one end to the free end of the first link and at its other end to the free end portion of the arm and movable from one side to the other of a dead center position with respect to a line drawn from the pivotal connection on the arm through the connection of the first mentioned link with the crank, means for positively limiting oscillatory movement of said connecting link in either direction, and spring means tending normally to move said connecting link in one direction to an extreme position.

12. A mechanical movement as set forth in claim 11, including stop means to limit movement of the arm at one end of its oscillatory movement, said stop means being so located in relation to the axis of rotation of said crank that the crank is free to turn past a dead center position while the arm is stopped, the connecting link providing the adjustable length connection between the link and arm being extensible to substantially right angle relationship to the arm while the arm is stopped.

13. A mechanical movement, comprising, in combination, a rotatable crank movable through 360°, a link pivotally connected with the crank for push and pull oscillation of an arm, an arm disposed in transverse relation to the link and pivotally mounted at its one end in fixed spaced relation to the axis of rotation of the crank operable at the free end portion thereof by the link and adapted when oscillated to communicate movement to a part or mechanism to be operated, and means providing a lost motion connection between the link and arm, whereby the crank has an adjustable length link connection with the free end portion of the arm, and spring means tending normally to maintain said adjustable length link connection at the shortest length.

14. A mechanical movement as set forth in claim 13, including stop means to limit movement of the arm at one end of its oscillatory movement, said stop means being so located in relation to the axis of rotation of said crank that the crank is free to turn past a dead center position while the arm is stopped, the means providing the lost motion connection between the link and arm permitting idle movement of the link with respect to the arm while the arm is stopped.

HERBERT MORTON.